United States Patent [19]
Haas

[11] 3,867,559
[45] Feb. 18, 1975

[54] METHOD FOR PRODUCING FILLED TUBULAR WAFFLES

[76] Inventor: Franz Haas, Gerstlgasse 25, A-1210 Wien, Austria

[22] Filed: Mar. 9, 1973

[21] Appl. No.: 339,502

Related U.S. Application Data

[62] Division of Ser. No. 207,475, Dec. 13, 1971, Pat. No. 3,793,938.

[52] U.S. Cl. .................................. 426/283, 426/138
[51] Int. Cl. .............................................. A21d 13/00
[58] Field of Search ....... 426/89, 94, 283, 284, 344, 426/138, 139, 143, 152, 275

[56] References Cited
UNITED STATES PATENTS

| | | | |
|---|---|---|---|
| 1,318,292 | 10/1919 | Laskey | 426/284 |
| 3,104,976 | 9/1963 | Tolley | 426/283 |
| 3,480,445 | 11/1969 | Slaybaugh | 426/284 |

FOREIGN PATENTS OR APPLICATIONS

| | | | |
|---|---|---|---|
| 262,187 | 6/1968 | Austria | 426/283 |

*Primary Examiner*—Raymond N. Jones
*Attorney, Agent, or Firm*—Bacon & Thomas

[57] ABSTRACT

A method and apparatus for producing tubular waffle shapes from a strip of waffle material wound helically on a mandrel in edgewise overlapping relationship, and contacted by steam before overlapping to adhesively bind the adjacent convolutions. The overlapping edges are pressed together by a guide roller to assure good adhesion and the tubular waffle shape is completely filled with a creamy substance and is cut into predetermined lengths before hardening.

4 Claims, 3 Drawing Figures

PATENTED FEB 18 1975  3,867,559

METHOD FOR PRODUCING FILLED TUBULAR WAFFLES

This is a division of copending application Ser. No. 207,475, filed Dec. 13, 1971, now U.S. Pat. No. 3,793,938 issued Feb. 26, 1974.

The invention relates to a method of producing tubular waffle shapes or waffle tubes by winding a strip of waffle material while still in the warm, plastic condition, wherein the strip of waffle material supplied by a continuously working waffle baking machine is continuously wound helically with suitable overlapping and the resulting wound shape is filled with a cream-like substance and cut into pieces of the desired length. A method of this kind is described in Austrian Pat. No. 262,187. In the form of execution of the method described therein the cream-like substance is sprayed on the inner wall of the wound shape which is cut up by sawing after it and the substance sprayed into it has hardened. In order not to delay the hardening excessively, only a small amount of creamy substance may be applied by spraying, so that, depending on requirements, subsequent filling of the hollow waffle shape may be necessary. Nevertheless, the sawing still requires separate cooling action, or at least a longer cooling path for the wound shape before it reaches the cutting station. These circumstances complicate the method in question and make it expensive.

The aim of the invention is a procedure by which completely filled waffle shapes can be produced at reduced cost and with increased output. The invention consists essentially in that the wound shape is completely filled with the cream-like substance and is cut up into desired lengths by shearing before this substance and the wound shape have been hardened. The shearing is effected while the wound shapes are soft and uncooled, at a relatively short distance from the winding and filling station. The complete filling of the wound shape with a creamy substance brings about its immediate stiffening, and above all ensures that the cross-section subjected to shearing will return to the circular shape. The lengths of separated completely filled waffle shapes, can be immediately collected and transported away for shipping and may cool or harden slowly during this transport.

In order to facilitate the building-up of the internal pressure bringing about the stiffening, good sealing or mutual welding of the individual turns of the strip of waffle material is desirable in order to prevent the cream substance from escaping at the sides. According to the invention this is achieved by steaming the overlapping surfaces of the strip of waffle material before overlapping. Such a strip of waffle material usually contains between 30 and 60% sugar, glucose, or malt preparations which, under the action of wet heat, start rapidly to dissolve and become sticky. When the first turn is overlapped a tight adhesive sealing is therefore effected immediately and since the activation by the steam is only on the surface this sealed portion hardens within a short time. A correct welding of the overlapped turns of strip material is achieved by the additional application of pressure.

Another aim of the invention is a suitable apparatus for carrying out the method according to the invention. For this purpose the invention takes as starting point the apparatus which is likewise known from Austrian Pat. No. 262,187, which has a winding mandrel provided with a longitudinal bore and may be mounted rotatably and adapted to be driven, a guide device, particularly with at least one guide roller for obliquely feeding the strip of waffle material to the winding mandrel and for pushing forward the wound shape formed on the winding mandrel, a pressure device for delivering creamy substance through the longitudinal bore in the winding mandrel into the interior of the wound body, and with a separating device for cutting the endless wound body to length. In the form of construction described the longitudinal bore of the winding mandrel is narrowed at its mouth to form a spray nozzle, and the separating device is a circular saw which must move forward together with the continuously advanced wound body during the separating operation and for this purpose is provided with special driving devices. Since sawing requires complete hardening and even requires that the waffle shape should be brittle, the saw is disposed at a sufficient distance from the winding mandrel, and the endless waffle shape is guided by means of special cooled supporting moulds between the winding mandrel and the saw.

The apparatus according to the invention is essentially characterized in that the longitudinal bore in the winding mandrel at least substantially retains its passage cross-section as far as the outlet at the end of the mandrel, and that the separating device is a shearing means. The unimpeded filling bore of the winding mandrel permits complete filling of the wound body with creamy substance using only a small pressure, while the shearing means permits instantaneous separation of the filled wound body and can therefore be stationary. Since the shearing cut is best made while the waffle shape is still warm and soft, the shearing means is preferably disposed a short distance from the winding mandrel and it is possible to work at correspondingly higher speed, since no special attention need to be paid to the cooling of the waffle shape.

For the purpose of carrying out the process with steam treatment use is preferably made of a nozzle which is connected to a source of steam and the steam jet is directed on to the strip of waffle material, preferably into the wedge-shaped winding gap between the arriving strip of waffle material and the first turn of the wound body being produced. Finally, provision is made for the guide roller to be mounted in such a manner that it can be pressed against the winding mandrel in order to permit pressure welding of the turns of the wound body. For this purpose it has been found particularly advantageous to use a guide roller which is disposed parallel to the axis of the winding mandrel and which is provided on its periphery with a screwthread advancing the wound body on the winding mandrel. This screwthread effects multiple application of pressure to the overlapping parts and therefore particularly intimate pressure welding.

One example of construction of the apparatus according to the invention is illustrated diagrammatically in the drawing in which.

Figure 2:
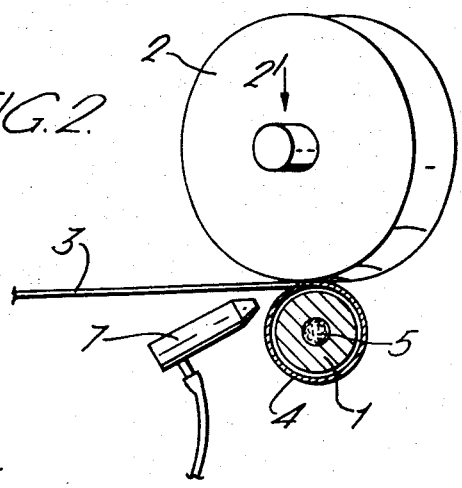
FIG. 2 is a side view, partly in section, along the line II—II in FIG. 1.

In the drawings, numeral 1 designates a winding mandrel which may be mounted rotatably and adapted to be driven. A drivable guide roller 2 is mounted above the winding mandrel 1 and disposed obliquly to its axis for the oblique feeding of the strip 3 of waffle material to the winding mandrel 1. The inclination is so selected that the strip 3 of waffle material is overlapped when wound on the winding mandrel. As indicated in FIG. 2, the guide roller 2 is mounted at 2' so that it can be pressed against the winding mandrel 1 in order to weld together the turns of the strip of waffle material wound on to the mandrel at the overlapping point. The roller 2 also continuously advances the wound body 4 on the winding mandrel 1 as it is formed thereon.

Figure 1:
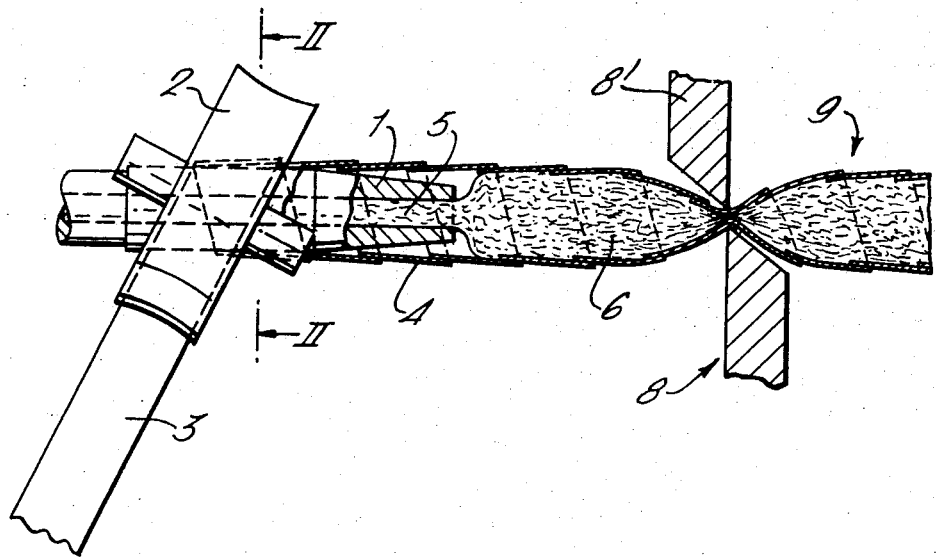
FIG. 1 is a plan view of the apparatus, partly in section.
Figure 3:
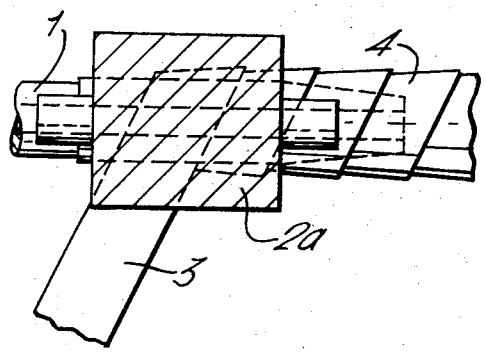
FIG. 3 is a plan view of a modified form of construction of the guide device used in the apparatus according to the invention.

While the guide roller 2 shown in FIG. 1 is provided with a slightly concave peripheral torus and is mounted with its axis inclined in relation to the winding mandrel 1, the guide roller 2a shown in FIG. 3 has its axis parallel to the winding mandrel 1 and carries a multiple screwthread on its periphery, these screwthreads being pressed against the wound body 4 in each case at the lowermost point and thus not only advancing the wound body on the winding mandrel 1 but also effecting the pressure welding of the overlapped turns of the strip 3 of waffle material wound on the mandrel.

Through a longitudinal bore 5 provided in the winding mandrel 1 and connected to a pressure source (not illustrated) for creamy filling substance, this substance 6 passes into the interior of the wound body 4. Due to the unimpeded outlet of the bore 5 the interior of the wound body 4 is thus completely filled with cream 6.

Beneath the guide roller 2 there is situated a nozzle 7 which is connected to a source of steam (not shown) and is directed into the wedge-shaped winding gap between the arriving waffle strip 3 and the first turn of the wound body 4, in order to permit the steaming of the waffle strip directly before the overlapping.

At a relatively short distance from the winding mandrel 1 and the guide roller 2, this distance depending on the production speed selected, there is disposed a stationary shearing means 8 which serves to cut off predetermined lengths 9 from the endless wound body 4. By means of the quickest possible cutting movement of the shearing cutter or cutters 8' the continuous advance of the wound body 4 is not hindered. The completely filled waffle shapes 9 cut to length are collected and transported away for shipping or for further processing, during which movement they can cool and solidify slowly.

What is claimed is:

1. In a method for producing tubular waffle shapes by winding a strip of waffle material which is still in a warm, plastic state, wherein the strip of waffle material supplied by a continuously working waffle baking machine is continuously wound helically with suitable overlapping, the resulting wound body is provided internally with a cream-like substance, hardened and divided into pieces of desired length, the improvement consisting in that the wound body is completely filled with the creamy substance and before the hardening of this substance and of the wound body, said wound body containing the creamy substance is sheared into pieces of the desired length whereby the cross section subjected to the shearing returns to the tubular shape.

2. A method according to claim 1, wherein the overlapping surfaces of the waffle strip are treated with steam before they are overlapped.

3. A method according to claim 2, wherein the overlapping is effected with the application of pressure.

4. A method according to claim 1, wherein the waffle is sheared into pieces within a relatively short distance after being completely filled with the creamy substance.

* * * * *